(12) United States Patent
Watanabe

(10) Patent No.: US 9,641,741 B2
(45) Date of Patent: May 2, 2017

(54) FOCUS DETECTION APPARATUS AND METHOD FOR CONTROLLING THE SAME

(71) Applicant: CANON KABUSHIKI KAISHA, Tokyo (JP)

(72) Inventor: Yumi Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 76 days.

(21) Appl. No.: 14/466,285

(22) Filed: Aug. 22, 2014

(65) Prior Publication Data
US 2015/0062379 A1 Mar. 5, 2015

(30) Foreign Application Priority Data

Aug. 30, 2013 (JP) ................................. 2013-180355
Jun. 16, 2014 (JP) ................................. 2014-123820

(51) Int. Cl.
*H04N 5/232* (2006.01)
*H04N 5/345* (2011.01)

(52) U.S. Cl.
CPC ..... *H04N 5/23212* (2013.01); *H04N 5/23219* (2013.01); *H04N 5/3456* (2013.01)

(58) Field of Classification Search
CPC ............. H04N 5/23212; H04N 1/2133; H04N 5/23219; H04N 5/23293; H04N 5/378; H04N 5/3456; G03B 13/06
See application file for complete search history.

(56) References Cited

U.S. PATENT DOCUMENTS

| | | | | |
|---|---|---|---|---|
| 4,201,977 A | * | 5/1980 | Shimizu | ................... G06K 9/42 382/217 |
| 4,908,773 A | * | 3/1990 | Pantoliano | ............. C07K 1/107 436/89 |
| 5,003,339 A | * | 3/1991 | Kikuchi | ............. H04N 5/23212 348/347 |
| 5,614,951 A | * | 3/1997 | Lee | ..................... H04N 5/23212 348/355 |
| 6,271,883 B1 | * | 8/2001 | Iijima | ................ H04N 5/23212 348/345 |
| 2014/0092294 A1 | * | 4/2014 | Iwabuchi | ........... H04N 5/23212 348/349 |

FOREIGN PATENT DOCUMENTS

JP 08-317272 A 11/1996
JP 2008-199477 A 8/2008

* cited by examiner

*Primary Examiner* — Luong T Nguyen
(74) *Attorney, Agent, or Firm* — Cowan, Liebowitz & Latman, P.C.

(57) ABSTRACT

In a focus detection apparatus having a plurality of filters suitable for processing of signals having different frequencies, a setting unit sets a thinning rate in a main-scanning direction of an image sensor depending on a filter to be used, a control unit controls to read image signals sequentially with the set thinning rate and store the read image signals in a storage unit, a processing unit processes the stored image signals with the filter and obtains a focus state evaluation value in a sub-scanning direction of the image sensor and a focus control unit performs the focus control processing based on the focus state evaluation value. If the filter to be used is for a second frequency that is higher than a first frequency, the setting unit sets a lower thinning rate than that for a filter for the first frequency.

7 Claims, 11 Drawing Sheets

F I G. 3
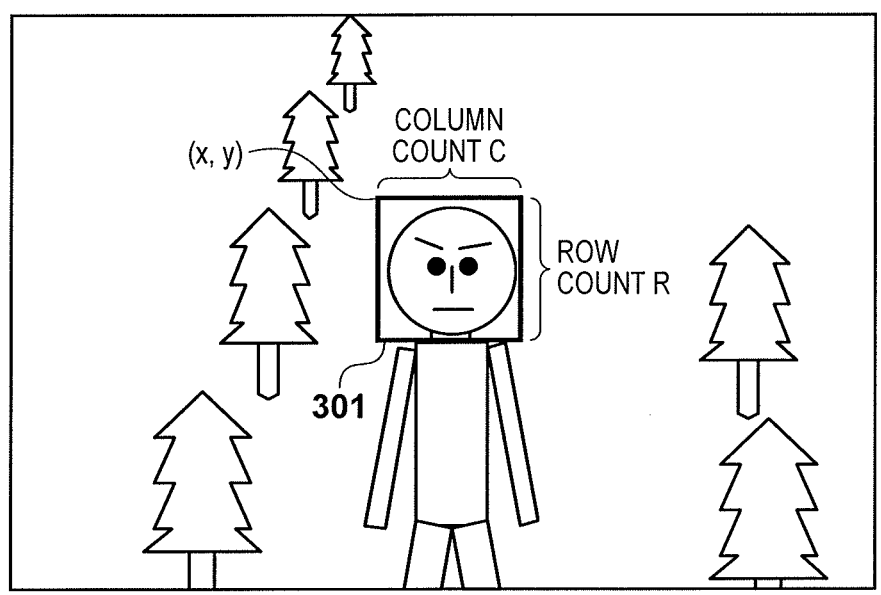

| FOCUS STATE LEVEL | FILTER | FILTER TAP COUNT (= REQUIRED MEMORY LINE COUNT) | THINNING RATE |
|---|---|---|---|
| HIGH | HIGH FREQUENCY | SMALL | LOW |
| LOW | LOW FREQUENCY | LARGE | HIGH |

FOCUS DETECTION APPARATUS AND METHOD FOR CONTROLLING THE SAME

BACKGROUND OF THE INVENTION

Field of the Invention

The present invention relates to a focus detection apparatus and a method for controlling the same, and in particular to a focus detection apparatus that performs focus control using an image signal obtained by an image sensor for capturing an image, and a method for controlling the same.

Description of the Related Art

In Digital cameras and video cameras, a contrast detection autofocus (referred to hereinafter as AF) method is typically employed that detects signals corresponding to contrast evaluation values of a subject, using output signals of an image sensor such as a CCD or CMOS sensor, and brings the subject into focus. In this method, the contrast evaluation values of the subject are sequentially detected while a focus lens is moved over a predetermined movement range in a direction of an optical axis (AF scanning operation), and a focus lens position having the highest contrast evaluation value is detected as an in-focus position.

Furthermore, focus detection apparatuses are known that store output signals from an image sensor in an internal memory (SDRAM), and obtain a contrast evaluation value between the stored output signals in the main-scanning direction and the sub-scanning direction of the image sensor, thereby performing more accurate focus control. Since the main-scanning direction of the image sensor is typically the horizontal direction and the sub-scanning direction is typically the vertical direction, contrast evaluation in the sub-scanning direction, or the vertical direction, requires memory capacity that can sufficiently record signals (sensor signals) of a plurality of lines from the image sensor.

Japanese Patent Laid-Open No. 8-317272 discloses a method for storing sensor signals in a state in which they are summed up in the horizontal direction (main-scanning direction), in order to reduce memory capacity when performing contrast evaluation in the vertical direction. Sensor signals of a single line are reduced to a summed signal that is a fraction of the sensor signals, and thus it is possible to realize focus state detection in the vertical direction (sub-scanning direction) with small memory capacity.

Japanese Patent Laid-Open No. 2008-199477 discloses a method that changes a thinning rate according to a focus state level, in order to reduce a calculation cost of focus state detection. High accuracy focus state detection is possible by increasing the thinning rate when an image is significantly blurred, and decreasing the thinning rate in the vicinity of an in-focus position.

However, in the conventional technique disclosed in Japanese Patent Laid-Open No. 8-317272, sensor signals in the main-scanning direction are summed with a constant adding rate to perform focus state detection in the vertical direction, irrespective to the focus state level, which may cause deterioration in accuracy in the focus state detection. For example, if an adding rate is increased in the vicinity of an in-focus position, focus state detection is performed in a state in which a high-frequency component is lost, resulting in focus state detection that does not have sufficiently high accuracy.

On the other hand, although the conventional technique disclosed in Japanese Patent Laid-Open No. 2008-199477 relates to the method that changes a thinning rate of a sensor signal according to the focus state level of a subject, no filtering processing at the time of obtaining a contrast evaluation value is disclosed. Nor is contrast evaluation in the sub-scanning direction disclosed. For example, in Japanese Patent Laid-Open No. 2008-199477, if an image is largely blurred, the focus state level is determined to be low and a thinning rate is set to a large value. In this case, evaluation that is performed using a signal that has passed through a high frequency band-pass filter may result in focus state detection that does not have sufficiently high accuracy.

SUMMARY OF THE INVENTION

The present invention has been made in consideration of the above situation, and realizes to perform high accuracy focus state detection both in the main-scanning direction and the sub-scanning direction of an image sensor using image signals obtained from the image sensor.

According to the present invention, provided is a focus detection apparatus comprising: a plurality of filters respectively suitable for processing of signals having different frequencies for obtaining a focus state evaluation value in a sub-scanning direction of an image sensor that has a plurality of pixels arranged two-dimensionally; a setting unit configured to set a thinning rate in a main-scanning direction of the image sensor depending on a filter to be used, of the plurality of filters; a control unit configured to perform control such that image signals are sequentially read with the thinning rate set by the setting unit from a detection area, on which focus control processing is performed, of areas of the plurality of pixels and are stored in a storage unit; a processing unit configured to process, each time image signals of the number of lines required for the processing by the filter to be used are stored in the storage unit, the stored image signals with the filter to be used and obtain a focus state evaluation value; and a focus control unit configured to perform the focus control processing based on the focus state evaluation value obtained by the processing unit, wherein, if the filter to be used is suitable for processing of a signal having a second frequency that is higher than a first frequency, the setting unit sets a thinning rate that is lower than that in the case where the filter is suitable for processing of a signal having the first frequency.

Furthermore, according to the present invention, provided is a method for controlling a focus detection apparatus that is provided with an image sensor having a plurality of pixels arranged two-dimensionally, and a plurality of filters respectively suitable for processing of signals having different frequencies for obtaining a focus state evaluation value in a sub-scanning direction of the image sensor, the method comprising: a setting step of setting a thinning rate in a main-scanning direction of the image sensor depending on the filter to be used, of the plurality of filters; a reading step of sequentially reading, with the thinning rate set in the setting step, image signals from a detection area, on which focus control processing is performed, of areas of the plurality of pixels, and storing the read image signals in a storage unit; a processing step of processing, each time image signals of the number of lines required for the processing by the filter to be used are stored in the storage unit, the stored image signals with the filter to be used and obtaining a focus state evaluation value; and a focus control processing step of performing the focus control processing based on the focus state evaluation value obtained in the processing step, wherein, if the filter to be used is suitable for processing of a signal having a second frequency that is higher than a first frequency, the setting step sets a thinning rate that is lower than that in the case where the filter is suitable for processing of a signal having the first frequency.

Further, according to the present invention, provided is a focus detection apparatus comprising: a control unit configured to perform control such that image signals are sampled for each line of an image sensor and are sequentially stored in a storage unit, the image sensor having a plurality of pixels arranged two-dimensionally; a plurality of filters respectively suitable for processing of signals having different frequencies for obtaining a focus state evaluation value; a selection unit configured to select a filter to be used, from among the plurality of filters; and a processing unit configured to process the stored image signals with the selected filter, wherein the number of sampling of the image signals in the line that are to be stored in the storage unit varies depending on the selected filter.

Further, according to the present invention, provided is a focus detection method, comprising: a control step of performing control such that image signals are sampled for each line of an image sensor, and are sequentially stored in a storage unit, the image sensor having a plurality of pixels arranged two-dimensionally; a selection step of selecting a filter to be used, from among a plurality of filters respectively suitable for processing of signals having different frequencies for obtaining a focus state evaluation value; and a processing step of processing the stored image signals with the selected filter, wherein the number of sampling of the image signals in the line that are to be stored in the storage unit varies depending on the selected filter.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 3 is a diagram illustrating an example of an AF frame according to the first embodiment;

DESCRIPTION OF THE EMBODIMENTS

Exemplary embodiments of the present invention will be described in detail in accordance with the accompanying drawings.

First Embodiment

Figure 1:
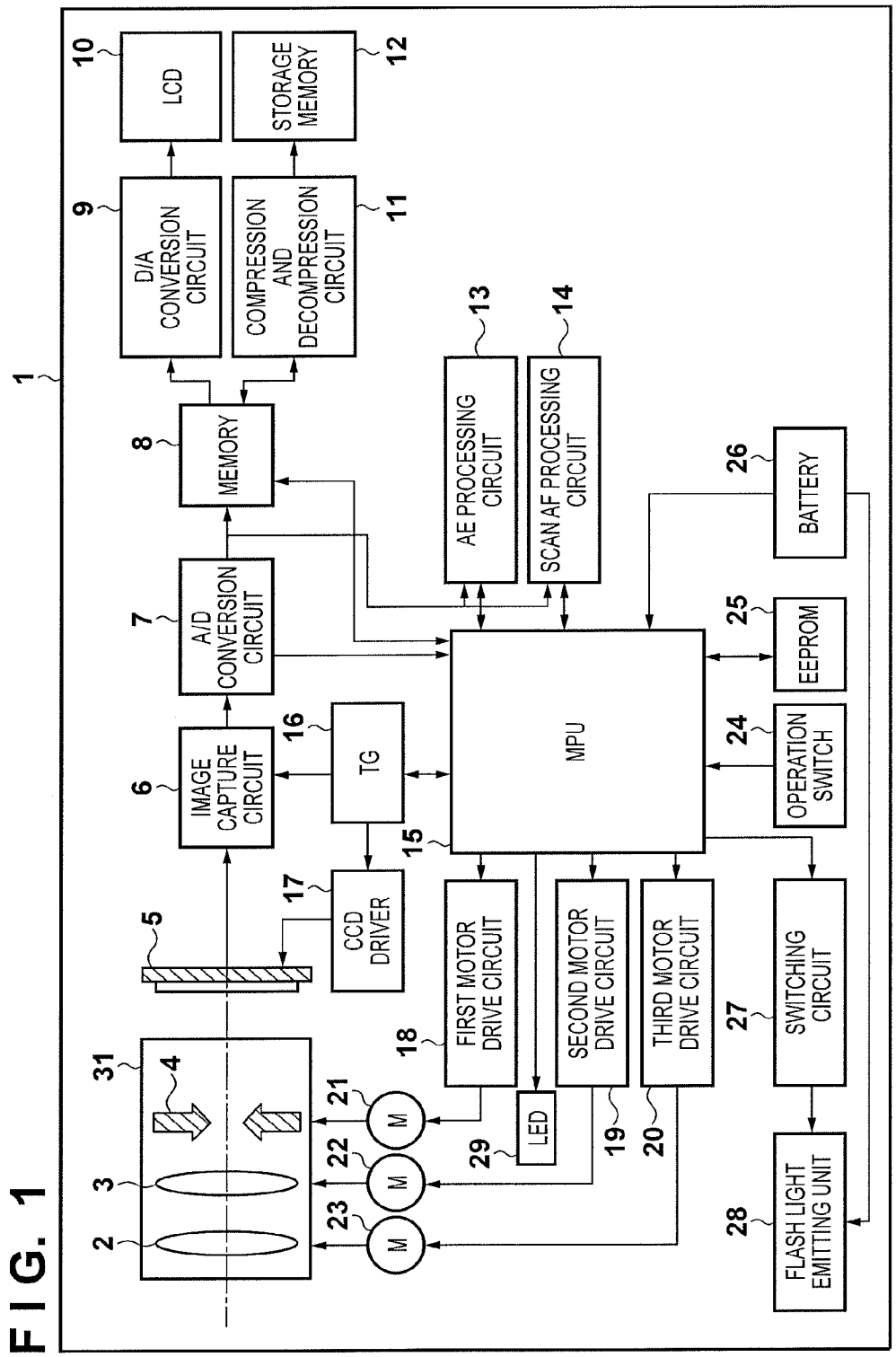
FIG. 1 is a block diagram illustrating a schematic configuration of an image capturing apparatus according to a first embodiment.

A first embodiment of the present invention will be described in detail with reference to FIGS. 1 to 6. FIG. 1 is a block diagram illustrating a schematic configuration of an image capturing apparatus including a focus detection apparatus, according to the first embodiment of the present invention.

In FIG. 1, an image capturing apparatus 1 includes, for example, a digital still camera, a digital video camera, or the like. A zoom lens group 2 and a focus lens group 3 constitute an imaging optical system. A diaphragm 4 controls the amount of light flux that passes through the imaging optical system. The zoom lens group 2, the focus lens group 3, and the diaphragm 4 are formed in the lens barrel 31.

An image sensor 5 is a sensor, represented by a CCD or CMOS sensor for example, that has a plurality of pixels arranged two-dimensionally and photoelectrically converts an image of a subject that is formed by passing through the imaging optical system. An image capture circuit 6 receives an electric signal that was photoelectrically converted by the image sensor 5, and subjects the received electric signal to various types of image processing, thereby generating a predetermined image signal. An A/D conversion circuit 7 converts an analog image signal generated by the image capture circuit 6 to a digital image signal.

A memory 8 is a buffer memory or the like that temporarily stores the digital image signal output from the A/D conversion circuit 7, and is constituted by a SDRAM, for example. An image signal output from a part of an imaging region of the image sensor 5 is stored in the memory 8, and the image signal stored in the memory 8 is read to a scan AF processing circuit 14, which will be described later, via a MPU 15, and can perform focus state detection.

A D/A conversion circuit 9 reads the image signal stored in the memory 8, and converts it into an analog signal and into an image signal suitable for being output for reproduction. An image display apparatus 10 is a liquid crystal display apparatus (LCD) or the like that displays the image signal converted by the D/A conversion circuit 9. A compression and decompression circuit 11 reads the image signal temporarily stored in the memory 8, and subjects the read image signal to compression processing or encoding processing to convert it into image data having a format that is suitable for the image data being stored in a storage memory 12. The storage memory 12 stores the image data processed by the compression and decompression circuit 11. Furthermore, the compression and decompression circuit 11 reads the image data stored in the storage memory 12 and subjects the read image data to decompression processing or decoding processing to convert it into image data having a format that is most suitable for the image data being reproduced and displayed.

Various types of memory may be used as the storage memory 12. The storage memory 12 may be, for example, a semiconductor memory such as a flash memory that is in the shape of a card or a stick detachable from the apparatus, or a magnetic storage medium such as a hard disk or a flexible disk.

An AE processing circuit 13 performs automatic exposure (AE) processing using an image signal output from the A/D conversion circuit 7. Furthermore, the scan AF processing circuit 14 performs autofocus (AF) processing using an image signal output from the A/D conversion circuit 7.

The MPU 15 controls the constituent components of the image capturing apparatus 1, and includes a computational memory. A timing generator (TG) 16 generates a predetermined timing signal. The reference numerals 17 denotes a CCD driver that drives the image sensor 5 based on the timing signal from the TG 16.

A first motor drive circuit 18 drives the diaphragm 4 by driving a diaphragm driving motor 21 based on control of the MPU 15. A second motor drive circuit 19 drives the focus lens group 3 by driving a focus drive motor 22 based on control of the MPU 15. Furthermore, a third motor drive circuit 20 drives the zoom lens group 2 by driving a zoom drive motor 23 based on control of the MPU 15.

An operation switch 24 is constituted by various types of switches that include, for example, a master electrical switch, a release switch for starting imaging operation or the like, a reproduction switch, a zoom switch, a switch for turning on/off display of an AF evaluation value signal on a monitor, and the like. The master electrical switch is a switch for activating the image capturing apparatus 1 and supplying power to the image capturing apparatus 1. Furthermore, the release switch is constituted by a two-stage switch that is operated by a first stroke for generating an instruction signal that instructs AE processing and AF processing that are performed prior to the imaging operation, and a second stroke for generating an instruction signal that instructs starting of the actual exposure operation. The reproduction switch starts a reproduction operation, and the zoom switch moves the zoom lens group 2 of the imaging optical system so that the zoom lens group 2 performs zooming.

An EEPROM 25 is a read-only memory that is electrically rewritable, and has stored in advance therein programs for executing various types of control, data for use in the various types of operations, and the like. The reference numeral 26 denotes a battery, the reference numeral 28 denotes a flash light emitting unit, the reference numeral 27 denotes a switching circuit for controlling flash light emission of the flash light emitting unit 28, and the reference numeral 29 denotes a display element such as a LED for displaying OK/NG of the AF operation.

Figure 2:
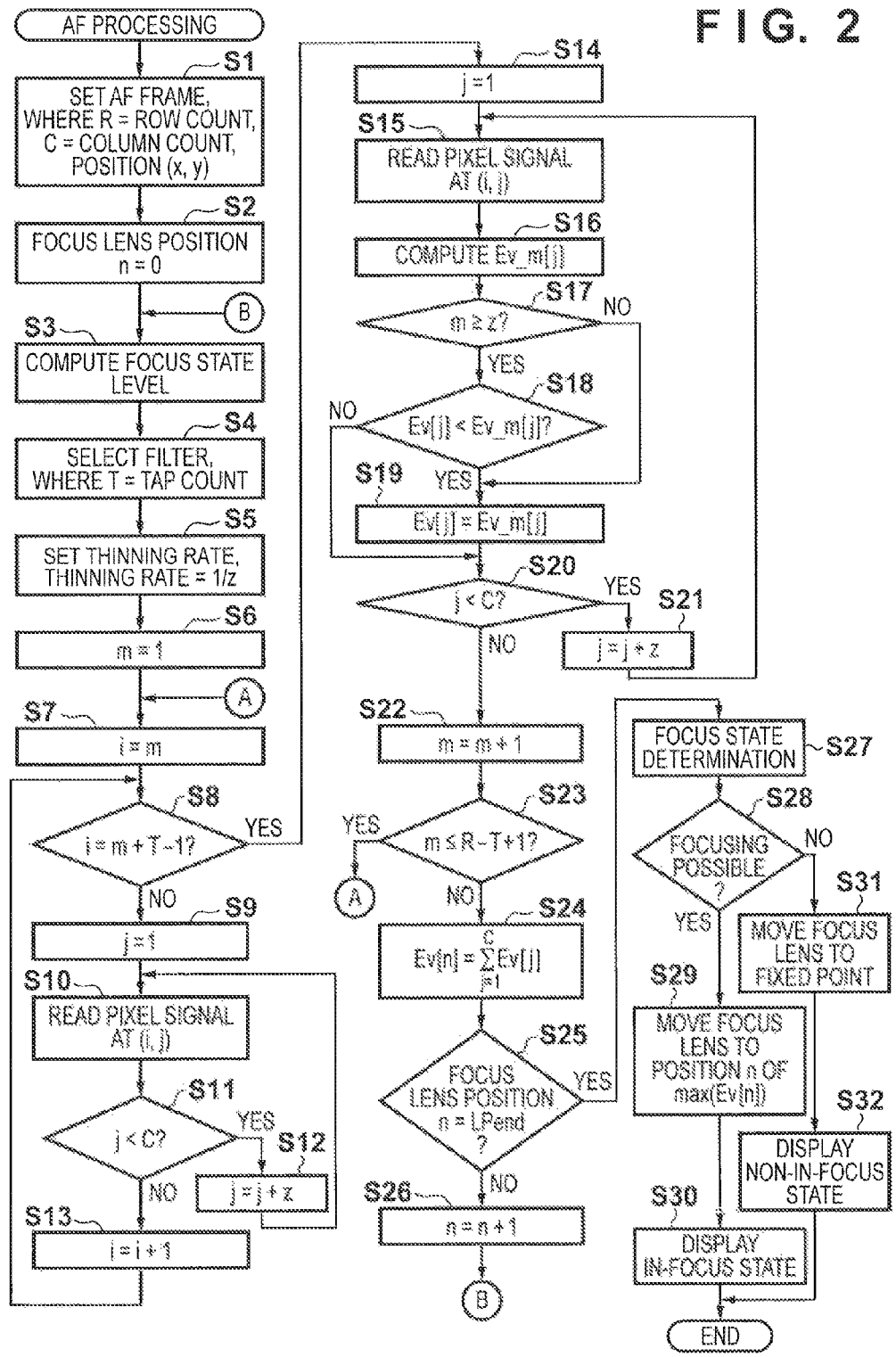
FIG. 2 is a flowchart illustrating AF operation procedures according to the first embodiment.

Hereinafter, a focusing operation (AF operation) of the image capturing apparatus 1 having the above-described configuration according to the first embodiment will be described with reference to FIG. 2. FIG. 2 is a flowchart illustrating procedures of the AF operation of the image capturing apparatus 1. A control program with respect to this operation is executed by the MPU 15.

After the start of AF operation, the MPU 15 first sets, in step S1, an AF frame. In this processing, as shown in FIG. 3, the position and size of an AF frame 301 that indicates a detection area on which focus control processing is performed are set with respect to the entire image area. The position and size of the AF frame 301 can suitably be determined manually or automatically according to the image capturing mode. FIG. 3 is a diagram illustrating an example in which the AF frame 301 is set for a human face in the face detection mode. The MPU 15 records the row count R, the column count C, and the position (x, y) of the AF frame 301 at that time. Note that the coordinates of another corner or the center of the AF frame 301, for example, may be set as the position of the AF frame 301.

In step S2, the focus lens group 3 moves its position (referred to hereinafter as "focus lens position") n to a scan starting position (n=0), in order to start AF scanning (focus state detection operation) of the AF frame 301 set in step S1. In step S3, image signals of pixels in the AF frame 301 are sequentially read at the focus lens position n to which the focus lens group 3 has moved, a focus state evaluation value E[n] is obtained in the scan AF processing circuit 14 by a well-known method, and the obtained focus state evaluation value E[n] is stored in the MPU 15. Furthermore, a focus state level is computed using the obtained focus state evaluation value E[n]. "Focus state level" used in the present first embodiment is a parameter whose value is larger with an increase in a degree of in-focus, and "the focus state level is high" when the image is in-focus, and "the focus state level is low" when the image is blurred. Here, a focus state level F[n] is, for example, a ratio between a focus state evaluation value E[n] in the main-scanning direction and a luminance signal differential value D[n] (luminance signal maximum value in the AF frame−luminance signal minimum value in the AF frame) at the focus lens position n. That is, the focus state level F[n] can be expressed in the following formula (1):

$$F[n]=E[n]/D[n] \quad (1)$$

In step S4, a filter is selected based on the focus state level obtained in step S3. Because the value of the focus state level F[n] in the in-focus state can be estimated in a setting condition, it is possible to determine how much the image is blurred based on the value of the focus state level F[n]. For example, it is determined that the focus state level is low when the value of the focus state level F[n] is a threshold or less, and the focus state level is high when the value of the focus state level F[n] exceeds the threshold. This determination of the focus state level may be performed in a binary manner, or in a step-wise manner according to the focus state level of each focus lens position.

Typically, if it is determined that the focus state level is low, a low frequency band-pass filter is selected that is suitable for processing of a lower frequency signal and has a variation in the evaluation value even if the image is significantly blurred. Whereas, if it is determined that the focus state level is high, a high frequency band-pass filter is selected that is suitable for processing of a higher frequency signal and has a large variation in the evaluation value in the vicinity of the in-focus position. Upon selection of a filter, a tap count T of the filter is determined. Typically, the tap count T of a high frequency band-pass filter is low, and the tap count T of a low frequency band-pass filter is high. The first embodiment intends to perform focus state evaluation in the vertical direction (sub-scanning direction) with respect to the main-scanning direction of the image sensor 5. Therefore, for the AF operation, the memory 8 needs at minimum a memory capacity to store the product obtained by the tap count T of the filter×the column count C (pixel count in the main-scanning direction) of the AF frame, which will be described later.

Figure 4:
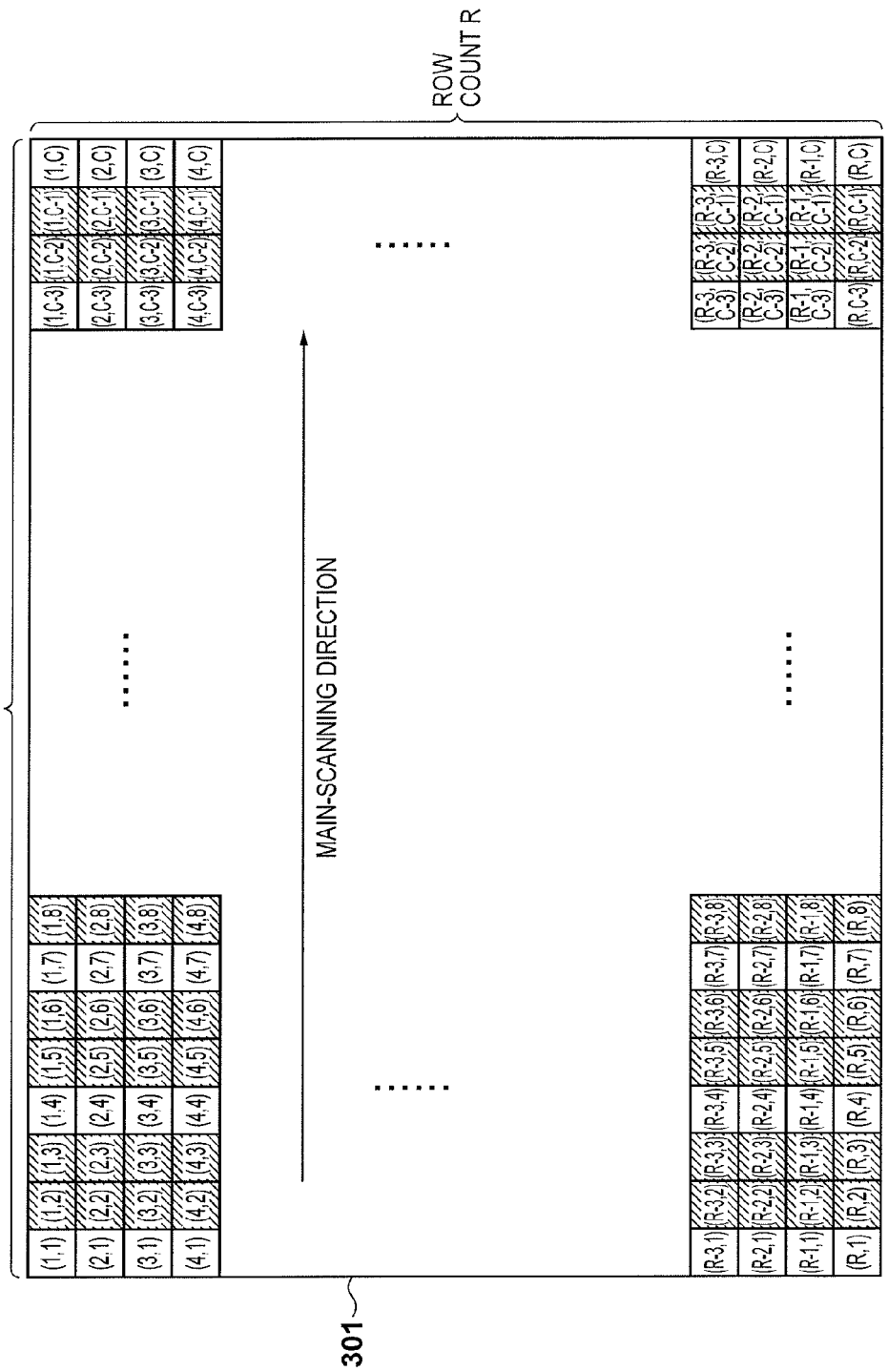
FIG. 4 is a diagram illustrating a thinning rate according to the first embodiment.

Then, in step S5, a thinning rate is set based on the tap count T selected in step S4, that is, the number of lines required for processing using the filter. FIG. 4 is a diagram illustrating a thinning rate in the first embodiment, and shows areas in the AF frame 301 in the case where the thinning rate of the image sensor 5 in the main-scanning direction is set to ⅓. In FIG. 4, each square frame denotes a single pixel (i, j), in which white pixels are pixels that are to be read, and shaded pixels are pixels that are not to be read. If the main-scanning direction is the row direction, thinning out is performed in the main-scanning direction, and thus reading is performed such that, for example, (1, 1), (1, 4), (1, 7), . . . , (1, C), (2, 1) (2, 4), (2, 7), . . . , (R, C). Furthermore, if thinning out is performed in the row direction such that, for example, (1, 1), (1, 7), . . . , (1, C) are read, this means that the thinning rate is ⅙, and in the present embodiment, it is expressed that the thinning rate ⅙ is "higher" than the thinning rate ⅓.

When the focus state level is higher, focus state detection with higher accuracy is necessary but only a low number of rows need to be read due to the reduced tap count of the filter, and it is possible to set a low thinning rate. In contrast, when the focus state level is low, a larger number of rows need to be read, and it is necessary to set a high thinning rate. 1/T may be selected as the thinning rate 1/Z, or the thinning rate may be obtained by the formula M/(T×R×C) where M is the memory capacity. The concept of combinations of the filter and the thinning rate depending on the focus state levels are summarized and shown in the table of FIG. 5.

Then, in step S6, a variable m is initialized to 1. Then, in step S7, i of (i, j) indicating the coordinates of a pixel in the AF frame 301 is set to the variable m, and in step S8, it is determined whether or not i is the last row for obtaining image signals of the tap count T of the filter starting from the m-th row (that is, it is determined whether or not i=m+T−1). In the example of FIG. 4, in the case where m=1 and the tap count T=3, it is determined whether or not i is the third row. If it is determined that i is the last row for obtaining image signals of the tap count T, the procedure advances to step S14, and otherwise to step S9.

In step S9, j of (i, j) indicating the coordinates of a pixel in the AF frame 301 is initialized to 1, and in step S10, an image signal is read from the pixel (i, j) and is stored in the memory 8. In step S11, it is determined whether or not j has reached the last column C (whether or not j<C). If it is determined that j has not reached the last column C, in step S12, the inverse number Z of the thinning rate selected in step S5 is added to j, the reading position is shifted by Z pixels, and thereby pixels are thinned out. Then, the procedure returns to step S10, where the processing in which an image signal is read from the pixel (i, j) and is stored in the memory 8 is repeated. For example, in the case where the thinning rate is 1/3, 3 is added to j, and thereby signals of pixels in the third column from here are read in the next routine. If it is determined, in step S11, that j has reached the last column C, in step S13, the row that is to be read is shifted to the next row (i=i+1), and the procedure returns to step S8.

With reference to the example of FIG. 4, the next image signal is read by performing the processing in the above-described steps S7 to S13. In the case where, for example, the variable m=1, the filter tap count T=3, and the thinning rate 1/Z=1/3, the white pixels (1, 1), (1, 4), . . . , (1, C), (2, 1), (2, 4), . . . , (2, C) enclosed in heavy lines are read and stored in the memory 8. Furthermore, in the case where the variable m=2, the pixels (2, 1), (2, 4), . . . , (2, C), (3, 1), (3, 4), . . . , (3, C) are read and stored in the memory 8.

If it is determined in step S8 that the row i that is to be read is the last row for obtaining image signals for the tap count T, the procedure advances to step S14, where j is initialized to 1, and in step S15, an image signal is read from the pixel (i, j) and stored in the memory 8. With this reading out, all pieces of data for computing a contrast evaluation value Ev_m[j] (focus state evaluation value) in the sub-scanning direction of the j-th column have been stored in the memory 8. Accordingly, in step S16, the contrast evaluation value Ev_m[j] of the j-th column is computed using the filter set in step S4. In the case where, for example, m=1 and j=1, in the pixel arrangement shown in FIG. 4, the computing is performed using:

$$Ev\_1[1]=(1,1)*tap\_1+(2,1)*tap\_2+(3,1)*tap\_3 \qquad (2),$$

where, in the above-described formula (2), (1, 1), (2, 1), and (3, 1) denote image signals read from the pixels of the corresponding coordinates, and tap_1, tap_2 and tap_3 denote filter coefficients.

In step S17, it is determined whether or not the variable m is 2 or more, and if it is determined that the variable m is less than 2, the procedure advances to step S19, where the contrast evaluation value Ev_m[j] computed in step S16 is maintained as a contrast evaluation value Ev[j] of the j-th column at the current focus lens position n.

On the other hand, if it is determined that the variable m is 2 or more, in step S18, the computed contrast evaluation value Ev_m[j] is compared with a previously stored contrast evaluation value Ev[j]. If the computed contrast evaluation value Ev_m[j] is larger than the previously stored contrast evaluation value Ev[j], the contrast evaluation value Ev_m[j] is maintained in step S19 as the contrast evaluation value Ev[j]. If the computed contrast evaluation value Ev_m[j] is not larger than the previously stored contrast evaluation value Ev[j], the procedure advances to step S20 without changing the contrast evaluation value Ev[j]. With this, the maximum contrast evaluation value of each column is maintained as Ev[j].

In step S20, similar to step S11, it is determined whether or not j has reached the last column C, and if it is determined that j has not reached the last column C, j is changed, in step S21, to the next column to be read, and the procedure returns to step S15, where the above-described processing is repeated. On the other hand, if it is determined that j has reached the last column C, the variable m is incremented by 1 in step S22, and it is determined, in step S23, whether or not the row required for processing using the incremented variable m is included in the AF frame 301, that is, whether or not m≤R−T+1. If it is determined that the row is included, the procedure returns to step S7, where the above-described processing is repeated.

On the other hand, if the row required for processing using the variable m is not included in the AF frame 301, this means that processing on all the areas of the AF frame 301 has been completed. Therefore, in step S24, all the contrast evaluation values Ev[j] of the columns are integrated to obtain a contrast evaluation value Ev[n] in the sub-scanning direction at the focus lens position n. Note that the obtained contrast evaluation value Ev[n] gets larger as the in-focus state gets nearer.

Then, the focus lens position n is set to the next position, that is, in step S25, it is determined whether or not the current focus lens position n is at a driving end position LPend in a drive range of the focus lens group 3. If it is determined that the current focus lens position n is not at LPend, the focus lens position n is shifted to the next position in step S26, and the procedure returns to step S3, and a contrast evaluation value Ev[n] in the sub-scanning direction at the next focus lens position n is obtained using the above-described procedures. If it is determined that the current focus lens position n is at LPend, the procedure advances to step S27, where focus state determination is performed.

Figures 5, 6:
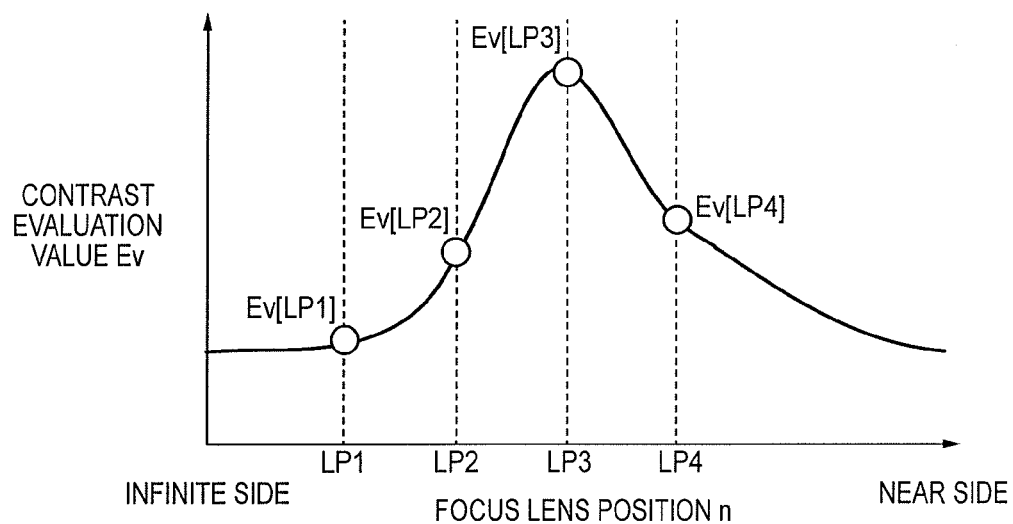
FIG. 5 is a diagram illustrating a concept of a combination of a focus state level, a filter, and a thinning rate according to the first embodiment.
FIG. 6 is a diagram illustrating an example of focus state determination according to the first embodiment.

FIG. 6 shows an example of focus state determination based on a contrast evaluation value Ev. As with in FIG. 6, the focus lens position n varies from LP1 to LP4, and the contrast evaluation values Ev[n] at respective focus lens positions n are shown by Ev[LP1] to Ev[LP4]. It is clear that, since the contrast evaluation value Ev[LP3] is the largest value in the example, the focus lens position LP3 is the position that is closest to the in-focus state.

In step S28, the MPU 15 determines whether or not focusing is possible. For example, when the contrast evaluation value Ev[n] has one peak value as shown in FIG. 6, it is determined that focusing is possible, but when the contrast evaluation value Ev[n] has two or more peak values, or when the contrast evaluation value Ev[n] does not have a peak value, it is determined that focusing is not possible. If it is determined that focusing is possible, the MPU 15 obtains, in step S29, a peak position (max(Ev[n])) based on the contrast evaluation value Ev[n], and drives the focus lens group 3 to the obtained peak position. In the example shown in FIG. 6, the focus lens group 3 is driven to the focus lens position LP3. Then, in step S30, the MPU 15 displays that the image is in-focus, and the AF operation ends.

On the other hand, if it is determined in step S28 that focusing is not possible, the MPU 15 drives, in step S31, the focus lens group 3 to a predetermined position that is referred to as "preset fixed point", such as for example a position at which the probability that a subject exists is high. Then, in step S32, the MPU 15 displays that the image is not in-focus, and the AF operation ends.

Figure 7A:
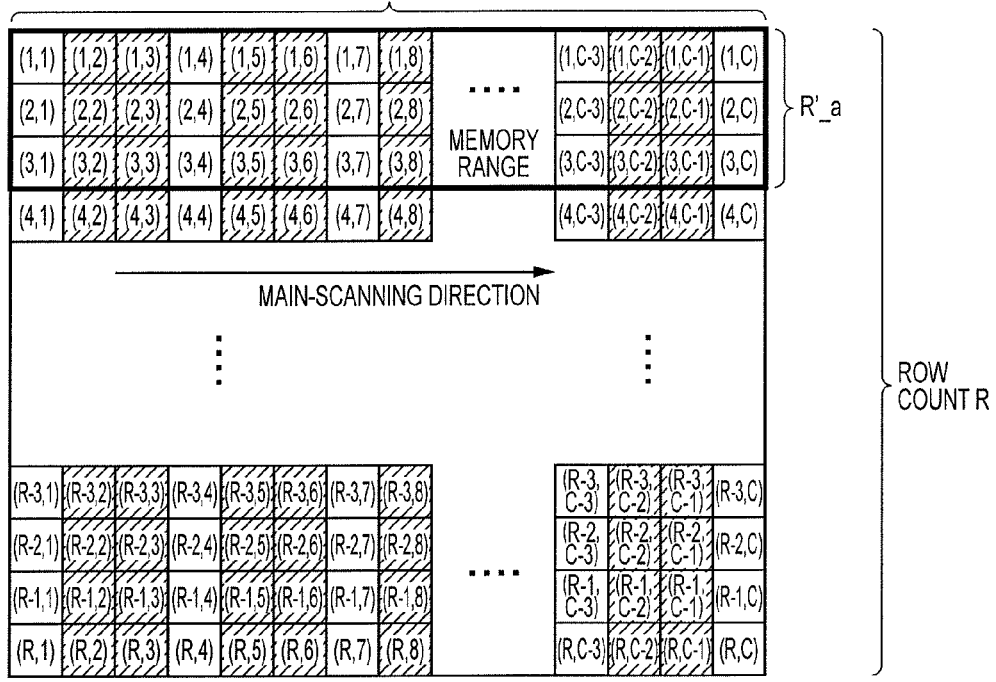
FIGS. 7A and 7B are diagrams illustrating concepts of pixels of an image sensor that are read in the different focus state levels according to the first embodiment.
Figure 7B:
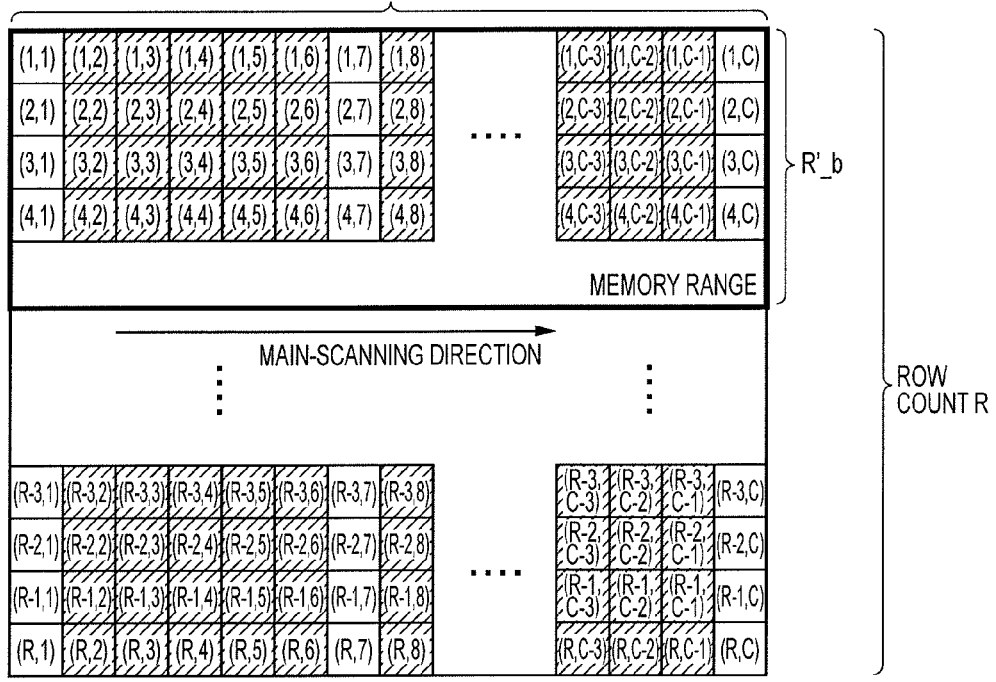

Hereinafter, pixels that are read in the AF operation will be described with reference to FIGS. 7A and 7B. FIG. 7A shows the example in which the thinning rate is ⅓, and FIG. 7B shown the example in which the thinning rate is ⅙. As shown in FIG. 5, if it is determined in step S4 that the focus state level is high, a high frequency band-pass filter whose tap count is low and that can evaluate a high-frequency component is selected and a low thinning rate is set. With this, the range and pixels to be read that are required for computing a contrast evaluation value in the sub-scanning direction are as shown in FIG. 7A. On the other hand, if it is determined that the focus state level is low, a low frequency band-pass filter whose tap count is high and that can evaluate a low-frequency component is selected and a high thinning rate is set, and the range and pixels to be read that are required for computing a contrast evaluation value in the sub-scanning direction are as shown in FIG. 7B. In other words, in FIG. 7A, since the thinning rate is low, the row count R'_a subjected to reading and storing is low, and in FIG. 7B, since the thinning rate is high, the row count R'_b subjected to reading and storing is higher than R'_a.

As described above, according to the present first embodiment, it is possible to obtain, with high accuracy, a contrast evaluation value in the sub-scanning direction, which is perpendicular to the main-scanning direction, while suppressing the capacity necessary for the memory 8 to a capacity to store the product obtained by the column count C/Z×the tap count T. That is, high accuracy focus state detection of an image sensor is possible both in the main-scanning direction and in the sub-scanning direction using image signals obtained from the image sensor, without increasing the memory capacity for use in a focusing operation.

Note that, although the foregoing description was made that, as shown in FIG. 4, thinning out is performed in which image signals that are to be read and image signals that are not to be read are repeated in a predetermined pattern, it is also possible that image signals are summed and read at the same cycle. For example, in the case where the thinning rate is ⅓, a method may be used in which image signals are summed by three pixels such that (1, 1)+(1, 2)+(1, 3), (1, 4)+(1, 5)+(1, 6), (1, 7)+(1, 8)+(1, 9), . . . , and are read and stored in the memory 8.

Furthermore, although the foregoing description was made taking the case where each time the variable m is incremented, image signals for T rows are newly read, it is also possible that, image signals of rows other than the first row of previously read image signals may be used in processing using the next variable m. Therefore, image signals in the first row of the image signals stored in the memory 8 are sequentially deleted, and the image signals of a newly read row are stored in the memory 8, thereby making it possible to reduce processing needed for reading out.

Furthermore, a configuration of the memory 8 is preferably as follows.

Figure 9A:
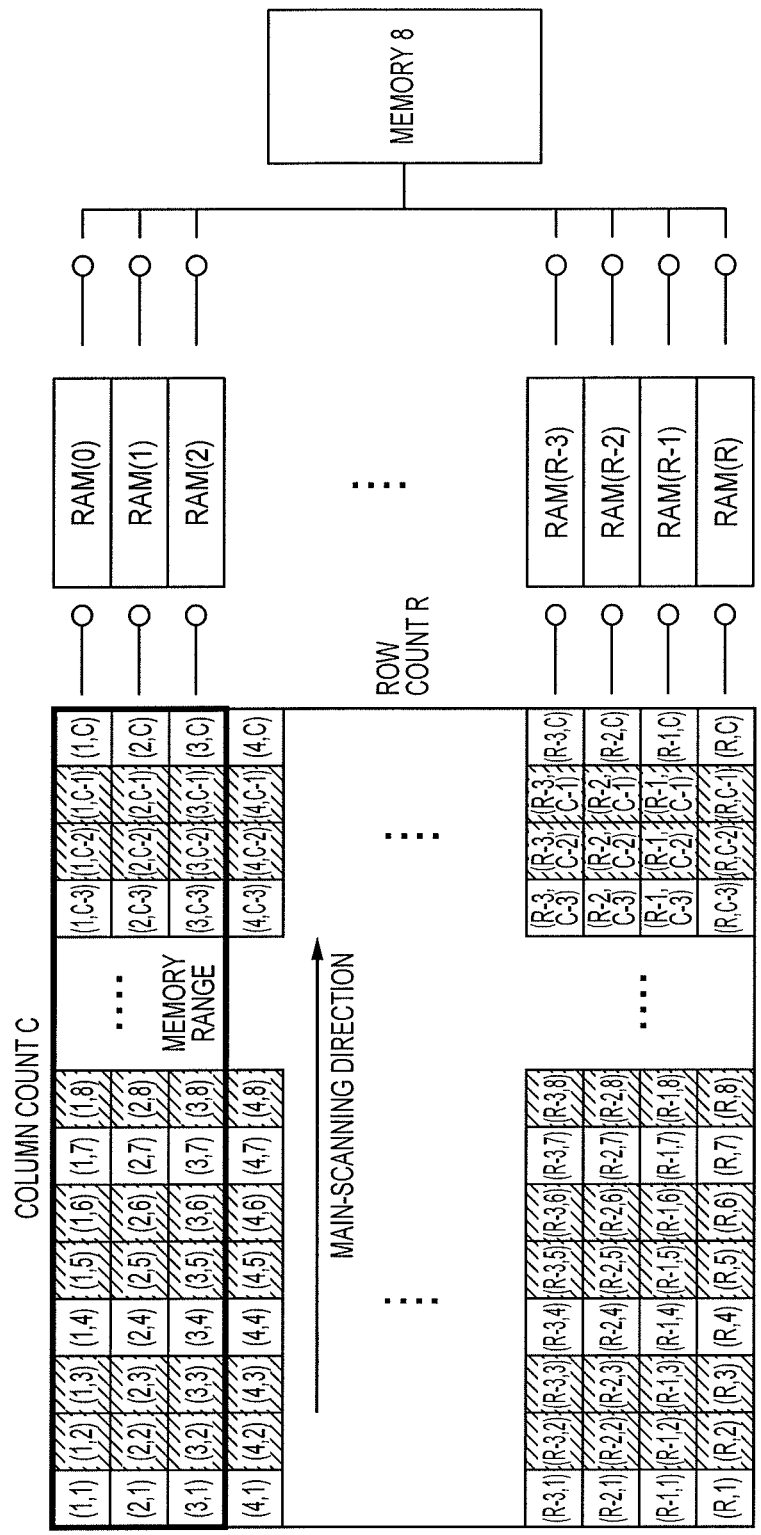
FIGS. 9A to 9D are diagrams for explaining a memory 8.
Figure 9B:
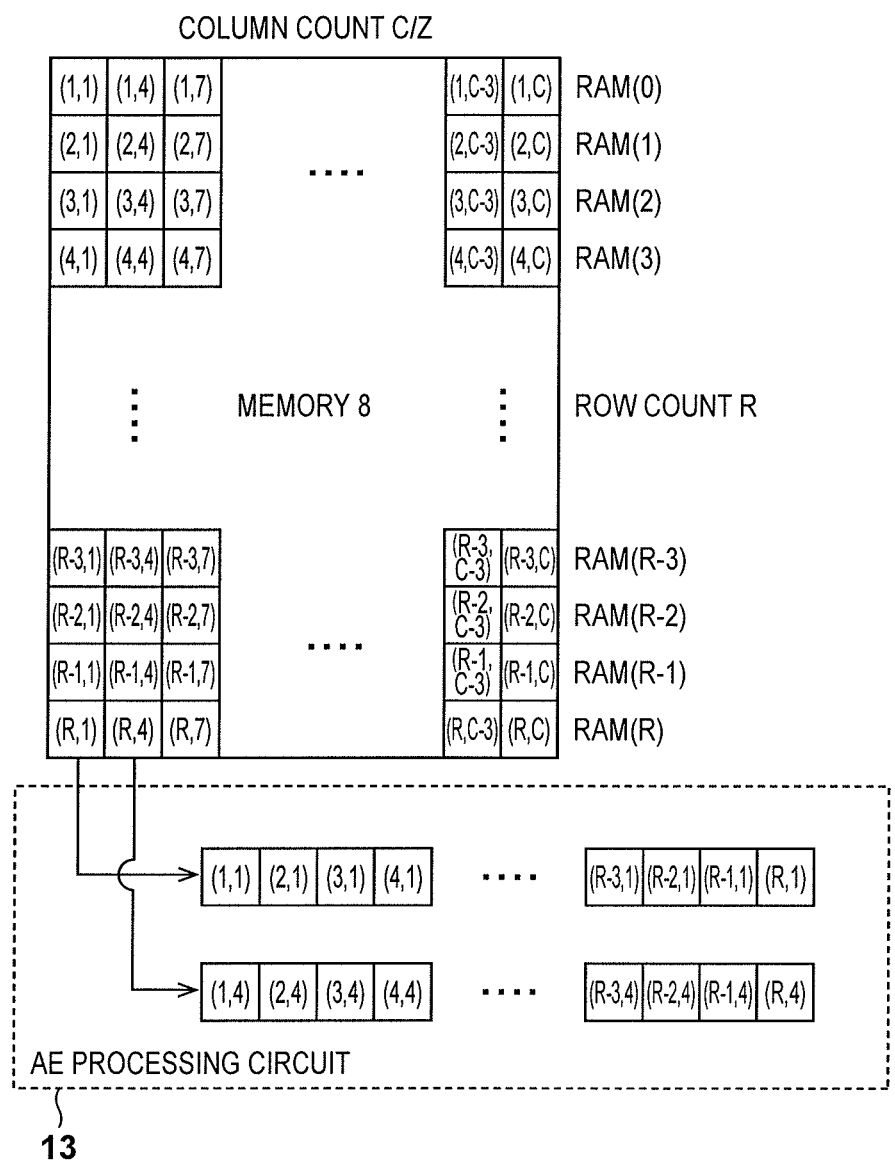

The configuration of the memory 8 is as shown in FIG. 9A. Information on the row count R=N that are read in a main scanning direction (the lateral direction in the example of FIG. 9) is first stored in a single line memory RAM(N). The information stored in each of line memories from RAM(0) to RAM(R) is then stored in the memory 8. Then, as shown in FIG. 9B, one piece of data of the information stored in the memory 8 is read from each RAM, and data for each column are transmitted through the AF processing circuit 13, thereby enabling smooth contrast evaluation in the vertical direction.

That is, it is preferable that each single memory RAM secure the capacity of C/Z. At that time, the capacity of the memory 8 is determined by C/Z×R.

As described above, when the memory 8 is constituted by a plurality of line memories RAM(N), it is preferable that the capacity C/Z of a single line memory RAM(N) be constituted by Z in the case of the highest thinning rate. This is to realize speeding up by suppressing the number of pieces of information that is needed to be read at the same time when information (R, C) is given to the AF processing circuit to 1, as shown in FIG. 9B.

Figure 9C:
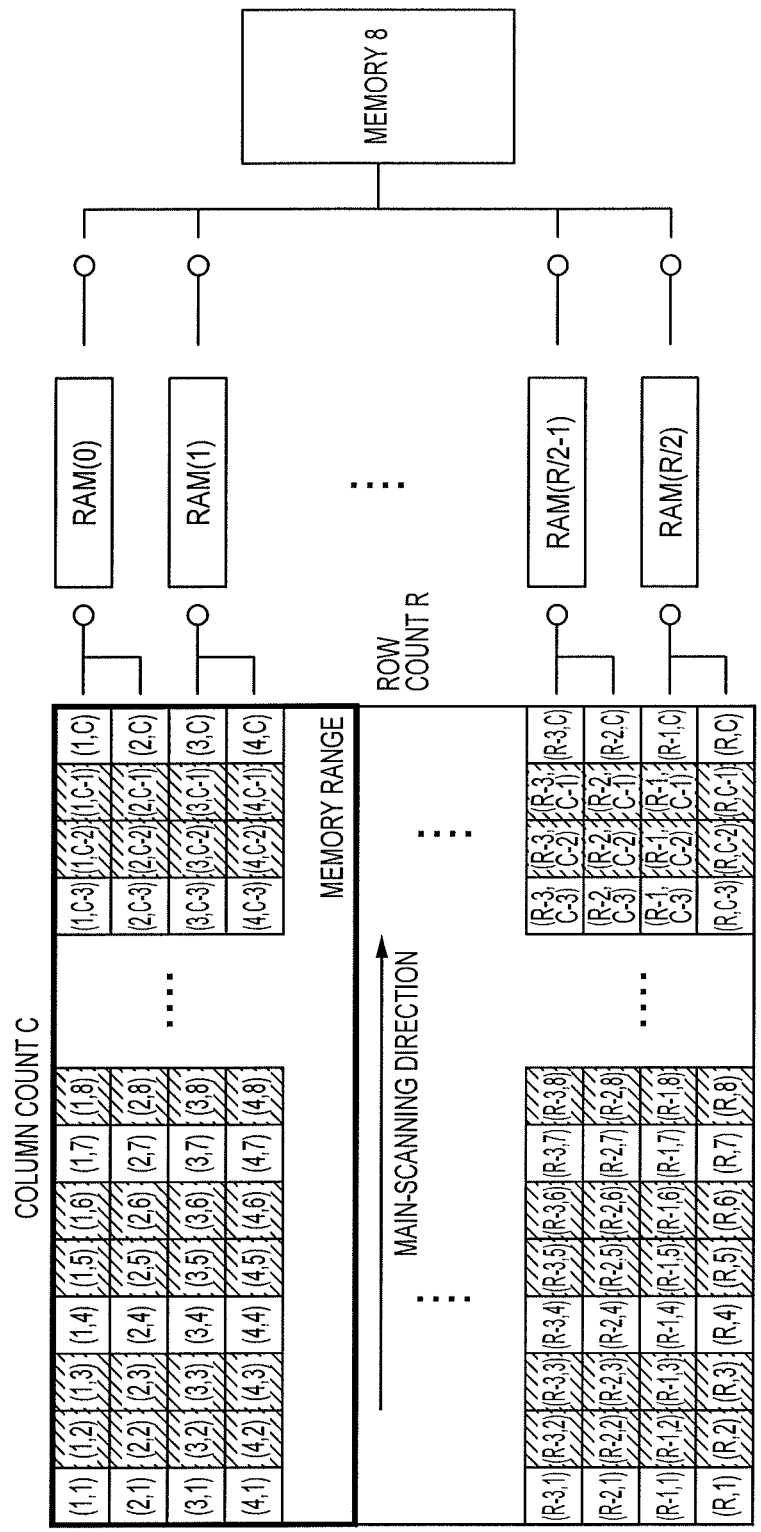
Figure 9D:
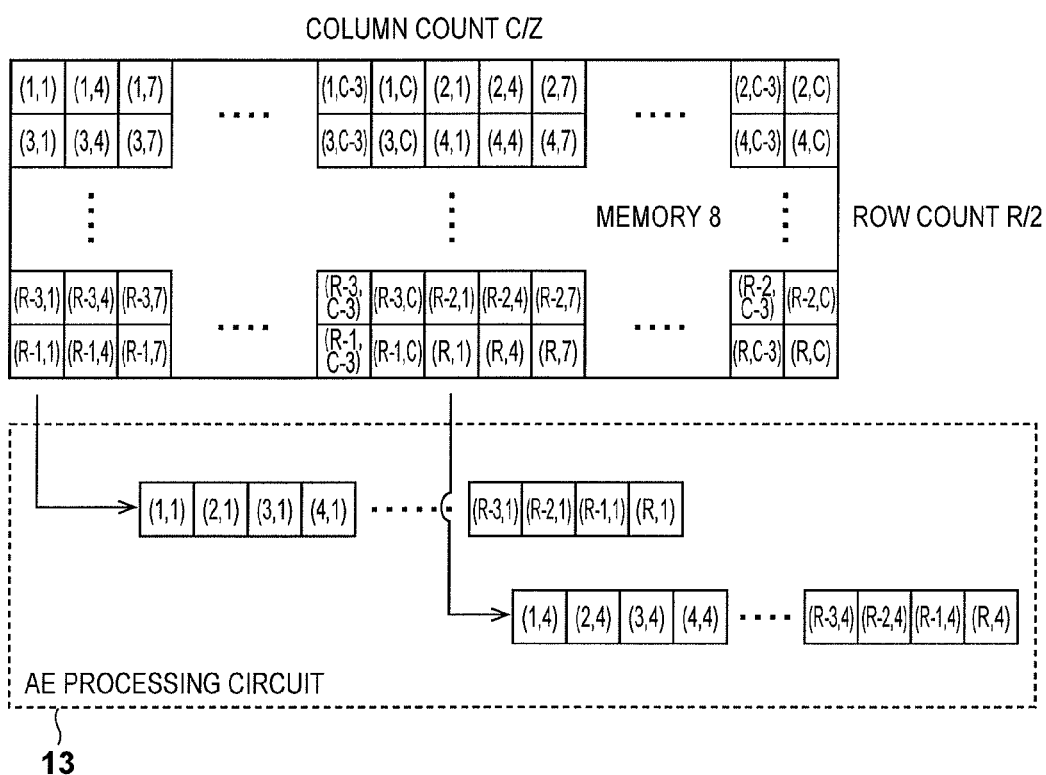

FIG. 9C shows another example of the configuration of line memories RAM(N). Each RAM(N) of FIG. 9C has the capacity that is twice as large as that of the RAM(N) shown in FIG. 9A, and the number of the line memories RAM(N) of FIG. 9C is one-half of that of the line memories RAM(N) shown in FIG. 9A. Even in this case, the necessary capacity of the memory 8 is the same but information for two lines is stored in one RAM(N), so the processing in the AF processing circuit 13 is as shown in FIG. 9D.

In other words, in the processing in the AF processing circuit 13, two pieces of information need to be read at the same time from a single line RAM(N), and thus the AF processing may slow down.

As described above, the RAM(N) in the memory 8 may preferably be configured to have the capacity C/Z that secures a space for the number of lines. When the thinning rate Z varies, it is preferable to set C/Z, where Z is the highest thinning rate.

Furthermore, separate memories 8 may be provided for a high frequency band-pass filter and a low frequency band-pass filter. In this case, although the memory capacity for use in a focusing operation increases, it is possible to store information for each line that is suitable for the processing in the AF processing circuit 13 in the memory 8. Accordingly, it is possible to perform, using image signals obtained from an image sensor, high accuracy focus state detection both in the main-scanning direction and the sub-scanning direction of the image sensor.

Second Embodiment

Figure 8:
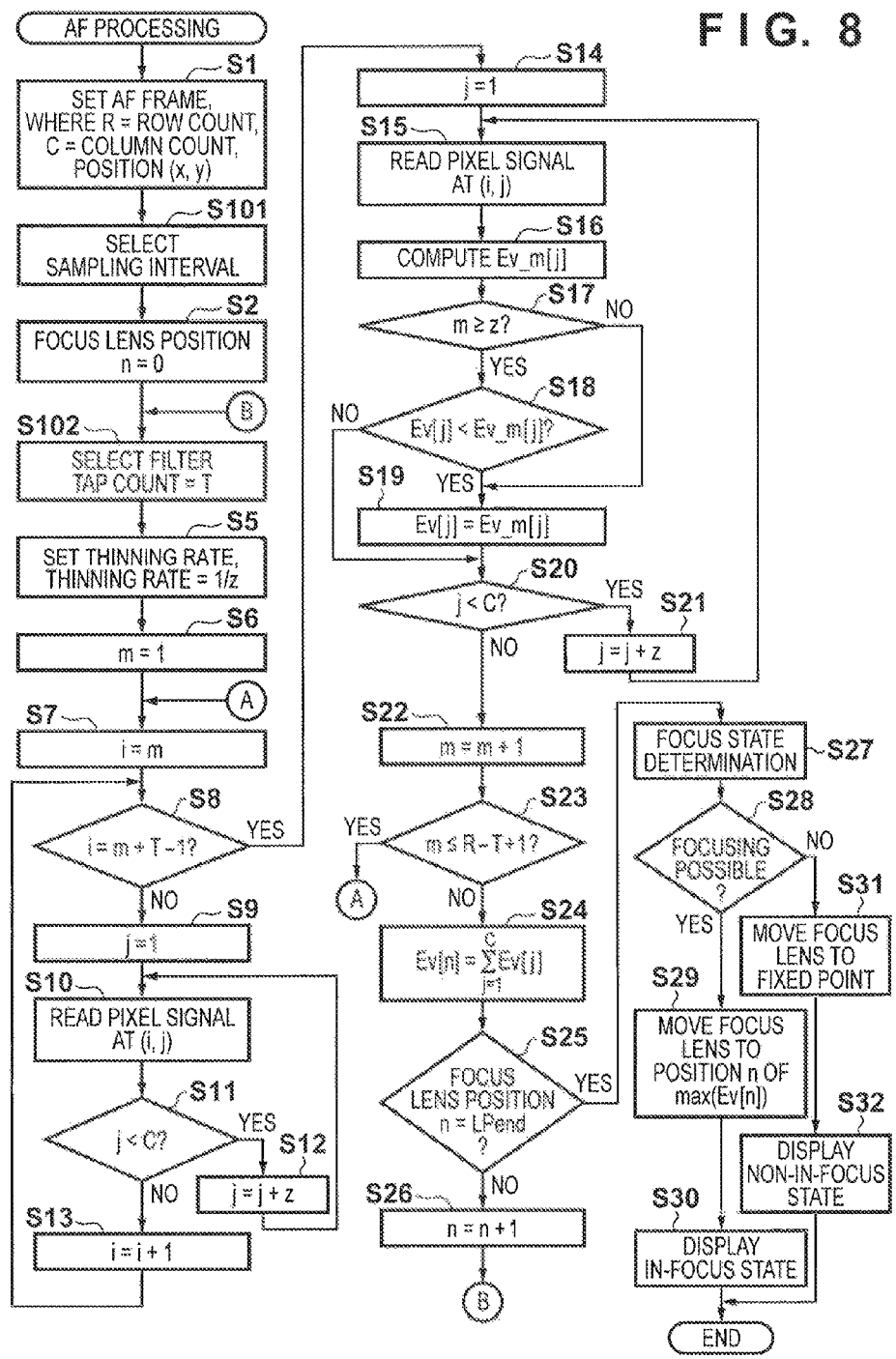
FIG. 8 is a flowchart illustrating AF operation procedures according to a second embodiment.

Next, AF operation of the image capturing apparatus 1 according to a second embodiment of the present invention will be described with reference to FIG. 8. Note that the configuration of the image capturing apparatus 1 is the same as that of the image capturing apparatus 1 described in the first embodiment, and thus description thereof is omitted. The main difference from the first embodiment is in the filter selecting method. In the foregoing first embodiment, a filter is selected according to the focus state level obtained at each focus lens position n. In contrast, in the second embodiment, a filter is selected according to a driving distance of the focus lens position (referred hereinafter to as "sampling interval")

per unit time. In FIG. 8, the same reference numerals are given to the same processing as that described with reference to FIG. 2, and description thereof is omitted appropriately.

After an AF frame is set in step S1, a sampling interval is selected in step S101. This sampling interval is changed depending on a scan mode. For example, in the case of a rough scan, in which an in-focus position is roughly searched for from an infinite position to a near end position, a wide sampling interval is set. On the other hand, in the case of a fine scan, in which the vicinity of the in-focus position found in the rough scan is more finely searched than in the rough scan, a narrow sampling interval is set. Furthermore, it is also possible to determine a sampling interval based on the lens driving speed driven by the focus drive motor 22. Assuming that the frame rate is the same, a wide sampling interval may be employed when the driving speed is high, and a narrow sampling interval may be employed when the driving speed is low.

In step S102, a filter is selected based on the sampling interval selected in step S101. When the sampling interval is wider than a predetermined threshold, a low frequency band-pass filter is selected, and when the sampling interval is the predetermined threshold or less, a high frequency band-pass filter is selected. From steps S5 onward, the same procedures as those in the foregoing first embodiment are performed.

According to the second embodiment, as described above, the same effects as those in the first embodiment can be achieved.

Note that descriptions of the foregoing first and second embodiments were made that the main-scanning direction of the image sensor 5 is the horizontal direction, but the present invention is not limited to this. For example, the main-scanning direction may be the vertical direction.

Moreover, in the first and second embodiments, the in-focus state of a subject is changed by moving the focus lens group 3, but the method for changing the in-focus state is not limited to this. For example, the method may be realized by moving the image sensor 5, instead of the focus lens group 3, so as to change the distance between the focus lens group 3 and the image sensor 5. Furthermore, the change of an in-focus state may be realized by performing re-configuration processing using an image capturing apparatus 1 that can obtain information on the incident angle of a light ray (light field information).

The present invention is also applicable to, in addition to the above-described image capturing apparatus, any apparatus that obtains an electrical image by photoelectrically converting an incident optical image using a solid-state image sensor such as an area sensor in which image elements are two-dimensionally arranged.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2013-180355, filed on Aug. 30, 2013 and 2014-123820, filed on Jun. 16, 2014 which are hereby incorporated by reference herein in their entirety.

What is claimed is:

1. A focus detection apparatus comprising:
an image sensor that has a plurality of pixels arranged two-dimensionally;
a processor and a memory storing therein program instructions which, when executed, cause the processor to operate as a setting unit, a control unit, a processing unit and a focus control unit, wherein:
the setting unit sets a thinning rate a main-scanning direction of the image sensor depending on a frequency of signals that are to be extracted from an image outputted from the image sensor and processed for obtaining a focus state evaluation value in a sub-scanning direction of the image sensor;
the control unit performs control such that image signals are sequentially read with the thinning rate set by the setting unit from a detection area, on which focus control processing is performed, of areas of the plurality of pixels and are stored in a storage unit;
the processing unit extracts, each time image signals of a number of lines required for a processing for obtaining the focus state evaluation value are stored in the storage unit, signals with the frequency from the stored image signals and obtains the focus state evaluation value using on the extracted signals; and
the focus control unit performs the focus control processing based on the focus state evaluation value obtained by the processing unit,
wherein the setting unit sets, in a case where the frequency is a first frequency that is higher than a second frequency, the thinning rate that is lower than that in the case where the frequency is the second frequency.

2. The focus detection apparatus according to claim 1, wherein the processor further operates as:
a computation unit configured to compute a focus state level based on an image signal obtained from the detection area; and
a selection unit configured to select, when the computed focus state level is a second focus state level that is higher than a first focus state level, to process signals with a frequency that is higher than a frequency when the computed focus state level is the first focus state level.

3. The focus detection apparatus according to claim 1, wherein the setting unit sets the thinning rate to 1/T, where T is the number of lines required for the processing.

4. The focus detection apparatus according to claim 1, wherein the setting unit sets the thinning rate to M/(T×R×C), where T is the number of lines required for the processing, M is a memory capacity of the storage unit configured to store the read image signals, R is the number of pixels in the detection area in the sub-scanning direction, and C is the number of pixels in the detection area in the main-scanning direction.

5. The focus detection apparatus according to claim 1, wherein the control unit performs processing with respect to an entire detection area while shifting a line to be processed.

6. A method for controlling a focus detection apparatus that is provided with an image sensor having a plurality of pixels arranged two-dimensionally, the method comprising:
a setting step of setting a thinning rate in a main-scanning direction of the image sensor depending on a frequency of signals that are to be extracted from an image outputted from the image sensor and processed for obtaining a focus state evaluation value in a sub-scanning direction of the image sensor;
a reading step of sequentially reading, with the thinning rate set in the setting step, image signals from a detection area, on which focus control processing is performed, of areas of the plurality of pixels, and storing the read image signals in a storage unit;

a processing step of extracting, each time image signals of a number lines required for a processing for obtaining the focus state evaluation value are stored in the storage unit, signals with the frequency from the stored image signals and obtaining the focus state evaluation value using the extracted signals; and a focus control processing step of performing the focus control processing based on the focus state evaluation value obtained in the processing step, wherein the setting step sets, in a case where the frequency is a first frequency that is higher than a second frequency, the thinning rate that is lower than that in the case where the frequency is the second frequency.

7. The method according to claim 6, further comprising:

a computation step of computing a focus state level based on an image signal obtained from the detection area; and a selection step of selecting, when the computed focus state level is a second focus state level that i higher than a first focus state level, to process signals with a frequency that is higher than a frequency when the computed focus state level is the first focus state level.

* * * * *